Patented June 30, 1931

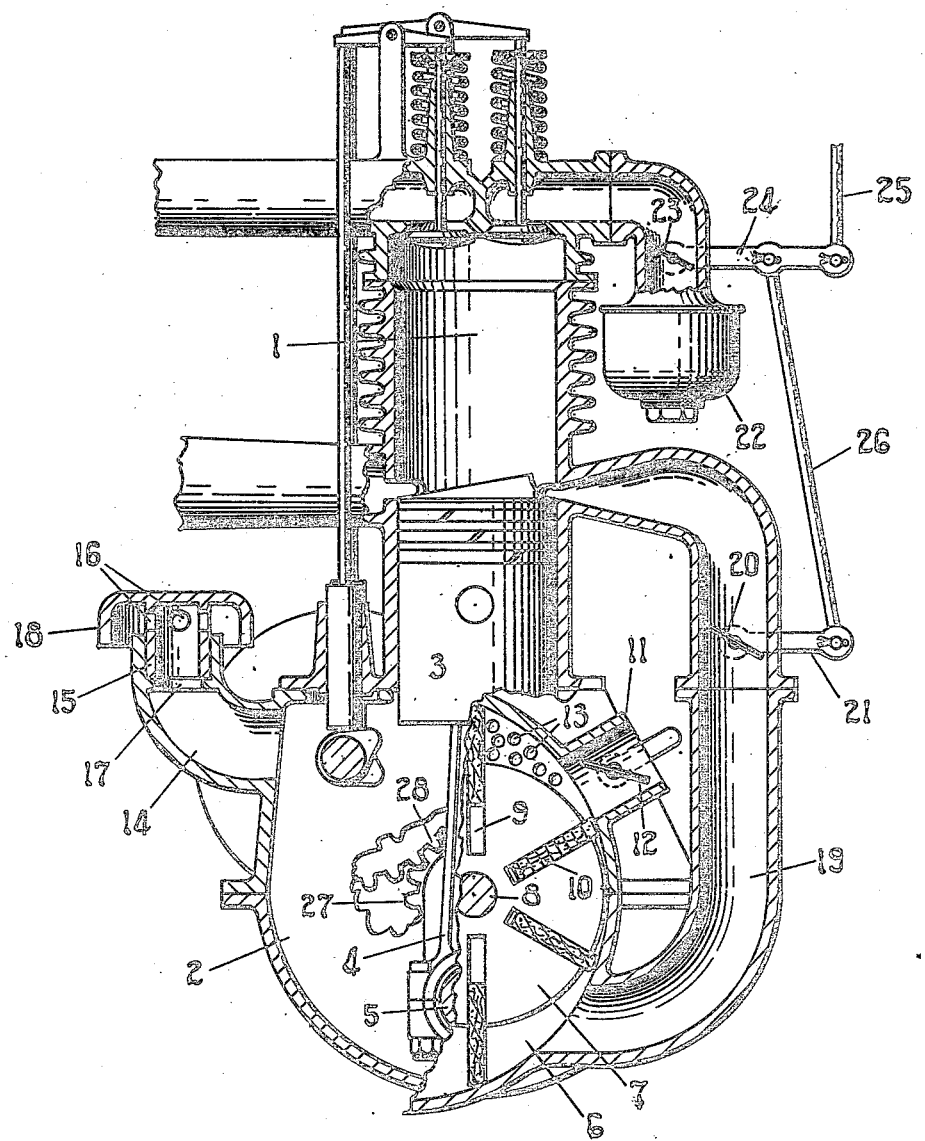

1,812,566

UNITED STATES PATENT OFFICE

OWEN H. SPENCER, OF INDIANAPOLIS, INDIANA

ENGINE CONTROL AND VENTILATING MEANS

Application filed March 21, 1929. Serial No. 348,907.

This invention relates to a combined air control and ventilating means for engines, designed primarily for use in connection with internal combustion engines, and one feature of the invention is the provision of means for entering air to a motor cylinder under more or less force.

A further feature of the invention is the provision of means in cooperation with a carbureter for regulating the flow of air to the cylinder and arranged to operate automatically with parts of the carbureter.

A further feature of the invention is the provision of manually operated means for regulating the supply of air to the air forcing means.

A further feature of the invention is the provision of means for obtaining a supply of air for the forcing means thru the crank case of an engine, whereby the interior of the crank case and parts therein will be more or less cooled by the passage of air therethru, and the fuel enriched by oil vapors from within the crank case.
Other objects and advantages will be hereinafter more fully set forth and pointed out in the accompanying specification.

In the accompanying drawing which is made a part of this application, The figure is a vertical sectional view thru an internal combustion engine, with parts broken out.

Referring to the drawing, the numeral 1 indicates the cylinder of the engine to which is attached a crank case 2, said cylinder having the conventional piston 3 mounted therein, which is operated by a connecting rod 4 and a crank shaft 5.

Associated with the crank case 2 is a charger chamber 6, in which is eccentrically mounted a charger mechanism comprising a circular body portion 7, mounted upon and driven by a shaft 8, said body 7 having a plurality of radiating slots 9 in which are longitudinally slidable blades 10, the outer ends of which bear against the peripheral wall of the charger chamber 6. The main volume of air for the charger mechanism is entered into the chamber 6 thru a port 11, in which is mounted a manually operated valve 12, by means of which the volume of air entering thru the port 11 may be regulated or practically entirely shut off.

In order to ventilate and cool to a degree, the interior of the crank case 2 and parts therein, the wall of the charger chamber 6 adjacent the crank case 2, is provided with a plurality of openings 13, thru which a limited amount of air may be drawn from the crank case 2. In order to supply said crank case with fresh air, a duct 14 is provided on said crank case, in the free end of which is entered a breather cap 15 which projects a distance above the duct 14, that part of the cap above the duct having openings 16 for the passage of air. The inner end of the cap 15 rests against a shoulder 17 within the duct 14 which limits the inward movement of the cap, while the outer end of the cap is provided with a cup shaped flange 18, which projects below the openings 16 and prevents foreign particles from being drawn into the crank case 2.

Communicating with the charger member 6 is an air passage 19, which conveys air from the charger chamber 6 to the lower end of the cylinder 1, and as the air is directed thru said passage with considerable force, a choke valve 20 is rotatably mounted in said passage and is operated by means of a lever 21.

Fuel is conveyed by suction as is common with four-cycle engines, to the cylinder 1 thru a carbureter 22, with which is associated a butter-fly valve 23, to which is attached an operating lever 24 and extending from said lever to any suitable point for ready manipulation is a rod 25. In order to operate the choke valve 20 and the butter-fly valve 23 in unison, a link 26 is extended from the lever 21 to the lever 24, so that when the lever 24 is operated to open or close the butter-fly valve, the choke valve 20 will be correspondingly operated in unison with said butter-fly valve. The choke valve 20 not only serves to regulate the flow of air thru the passage 19, but also serves to create a back pressure against the charger mechanism, which will result in checking the momentum of the motor, as when the engine is running idle, or when it is slowed down, by cutting down the supply of fuel thru the carbureter, and as the operation of the carbureter valve is transmitted to the choke valve, the effect of the choking action will be instantaneous with the closing of the carbureter valve.

As previously stated, the air for the charger mechanism may be mostly taken thru the port 11, but when desired, as in warm weather, the valve 12 may be partially or wholly closed, thus setting up a strong suction thru the openings 13, thus getting the supply of air thru the crank case 2, which will ventilate and cool the interior of said crank case, the state of the weather to a great extent determining the degree to which the valve 12 is closed. It will be also understood, of course, that a lesser amount of air will be required for the cylinder under certain conditions as in warm weather, hence the desired amount of air will be obtained from the crank case during the warm weather, which will be enriched by oil vapor and mist within the crank case 2.

The charger mechanism is driven from parts of the engine thru the shaft 8 which is conveniently coupled with the engine crank shaft 27 so that any braking action set up against the charging mechanism will be instantly imparted to the moving parts of the engine.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

I claim as my invention:

1. The combination with the cylinder and crank case of an engine, said crank case having openings for receiving and discharging air, of a charger chamber attached to the crank case and over the discharge openings in the crank case, a rotatably mounted charger mechanism within said charger chamber, an air passage leading from said charger chamber to said cylinder, a choke valve in said air passage, a carbureter connected with said cylinder, a controlling valve for said carbureter, and means connecting said controlling valve with said choke valve for causing said choke valve to operate coincident with said controlling valve.

2. The combination with the cylinder and crank case of an engine, said crank case having openings for the admission and discharge of air therefrom, of a charger chamber associated with said crank case, a charger mechanism rotatably mounted within said chamber, means for causing said charger mechanism to obtain its supply of air either through the air admission openings of the crank case or externally of said charger chamber, means connected with the charger chamber for conveying air to the cylinder, a valve for controlling the passage of air through said air conveying means, a carbureter connected with said cylinder, a controlling valve for said carbureter, and means for causing said valves to operate in unison.

3. The combination with a cylinder and crank case of an engine, said crank case having openings for the admission and exhaustion of air therefrom, of a charger chamber associated with the exhaust openings of the crank case, a charger mechanism rotatably mounted therein, an air passage extending from said charger chamber to the lower end of said cylinder, means for controlling the passage of air through said air passage, a carbureter communicating with said cylinder at the upper end thereof, a controlling valve for said carbureter, and means for causing both of said valves to operate in unison.

In testimony whereof, I have hereunto set my hand on this the 16th day of March, 1929, A. D.

OWEN H. SPENCER.